March 15, 1960 G. BONMARTINI 2,928,695
ROLLING DEVICE FOR VEHICLES OF ANY KIND
Filed Nov. 28, 1956 8 Sheets-Sheet 1

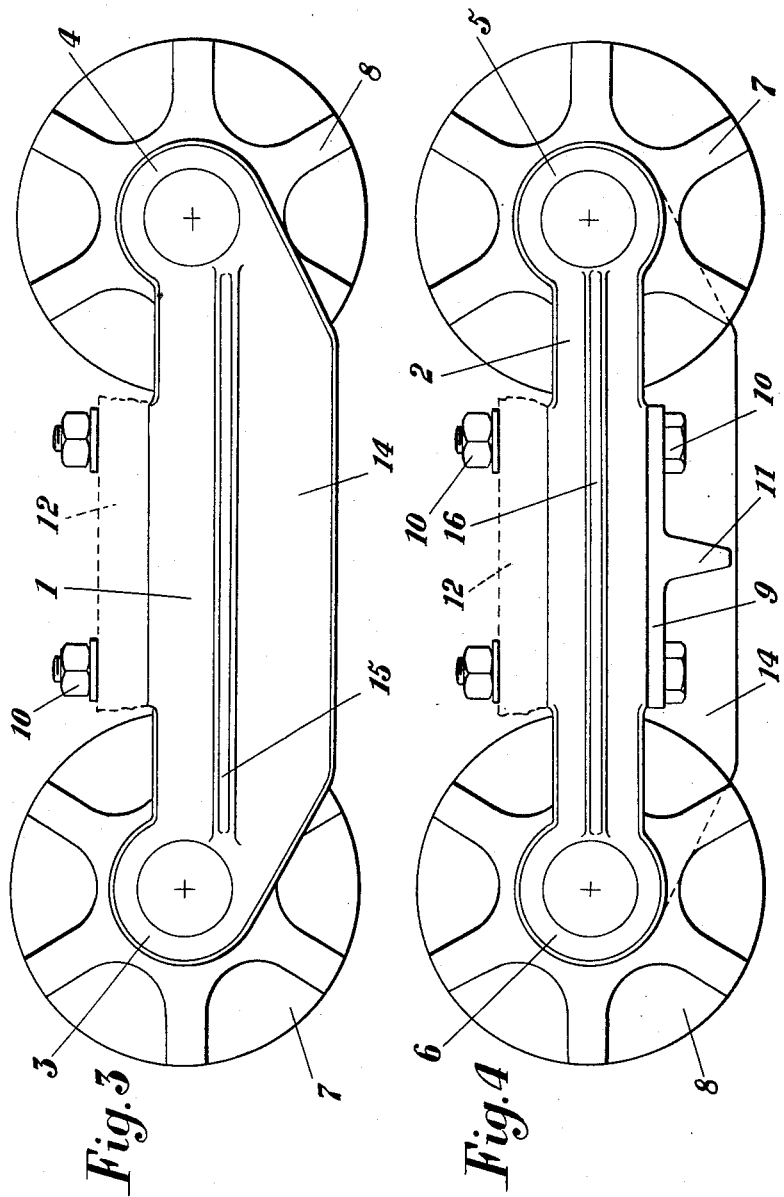

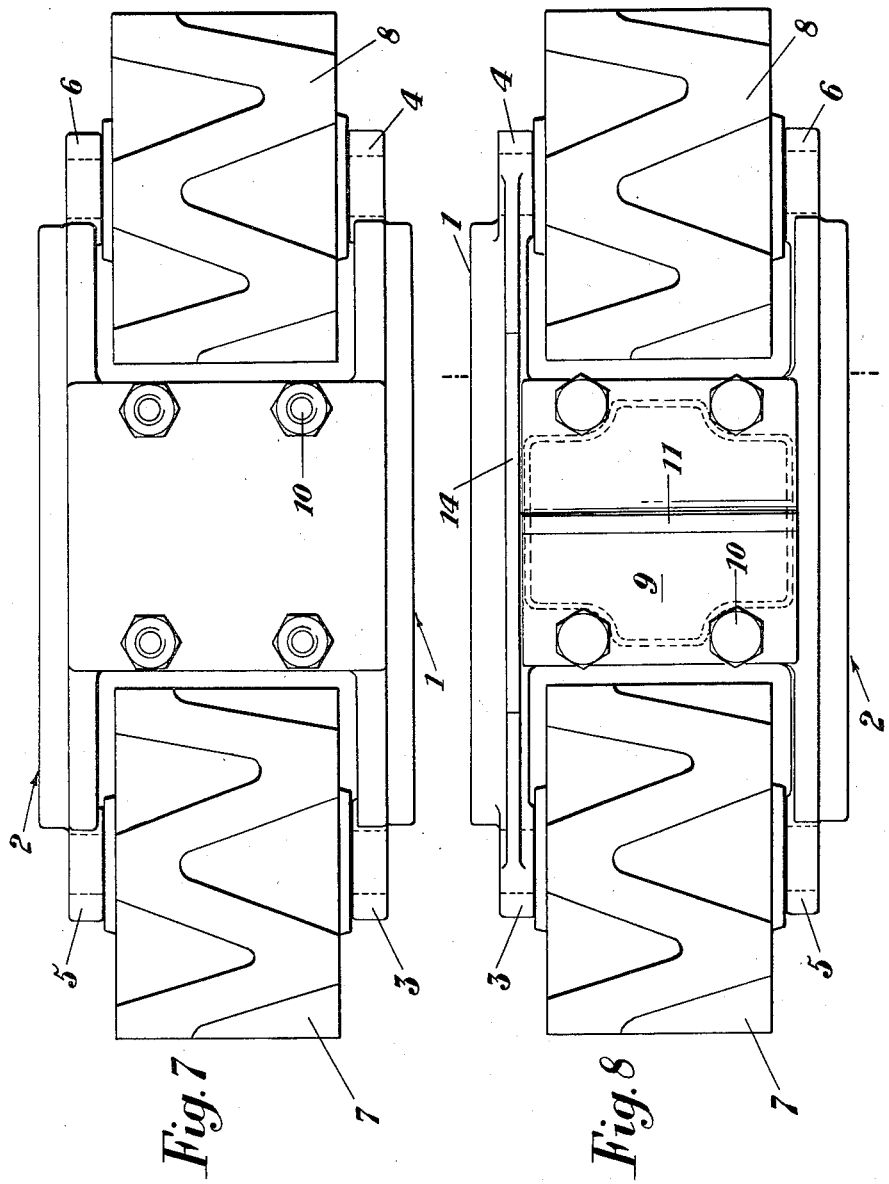

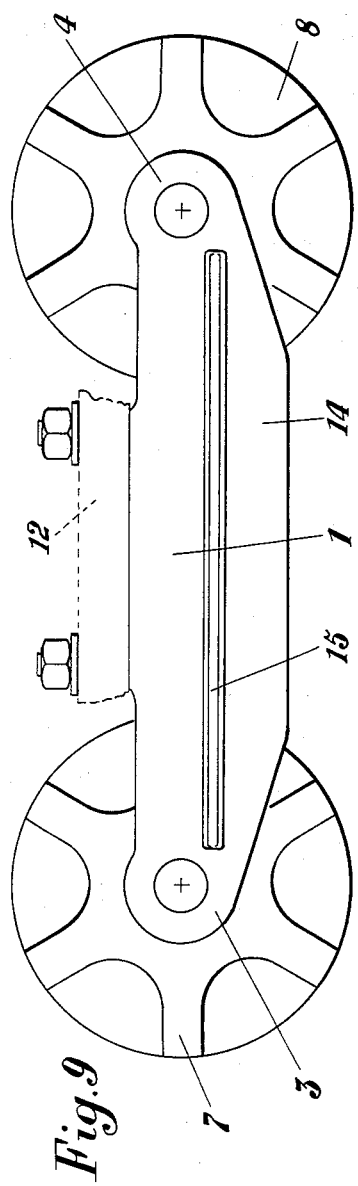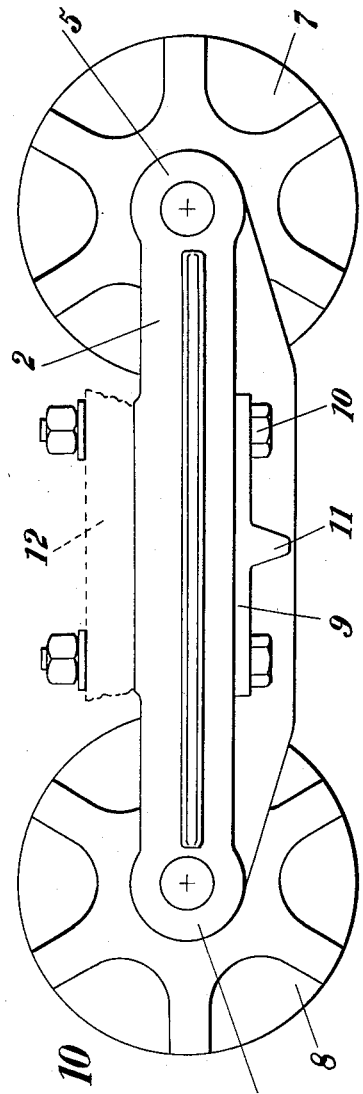

March 15, 1960  G. BONMARTINI  2,928,695
ROLLING DEVICE FOR VEHICLES OF ANY KIND
Filed Nov. 28, 1956  8 Sheets-Sheet 6
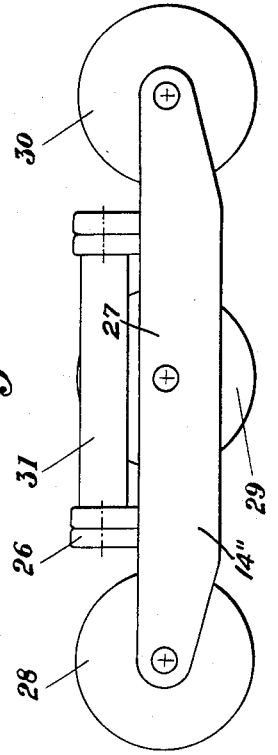
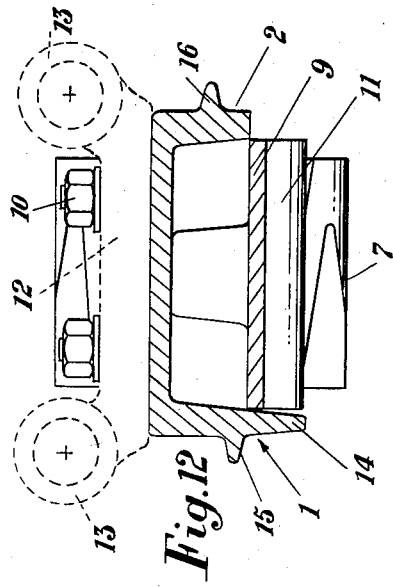
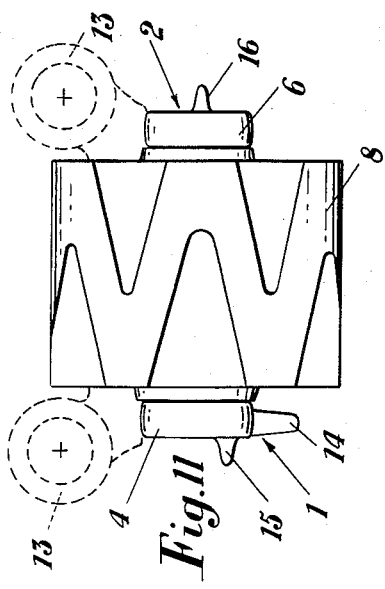
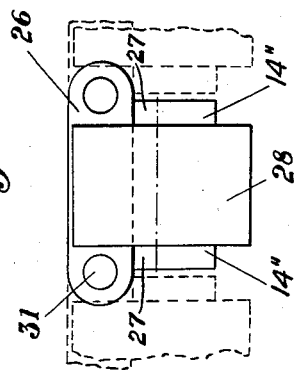

March 15, 1960 G. BONMARTINI 2,928,695
ROLLING DEVICE FOR VEHICLES OF ANY KIND
Filed Nov. 28, 1956 8 Sheets-Sheet 7

March 15, 1960  G. BONMARTINI  2,928,695
ROLLING DEVICE FOR VEHICLES OF ANY KIND Filed Nov. 28, 1956  8 Sheets-Sheet 8

INVENTOR.
Giovanni Bonmartini
BY

United States Patent Office 2,928,695
Patented Mar. 15, 1960

2,928,695

ROLLING DEVICE FOR VEHICLES OF ANY KIND

Giovanni Bonmartini, Rome, Italy, assignor to EST Etablissement Sciences Techniques, Vaduz, Liechtenstein, a Liechtenstein company Application November 28, 1956, Serial No. 624,850

Claims priority, application Italy April 20, 1956

9 Claims. (Cl. 305—58)

This invention relates to traction means for vehicles and more particularly to a roller carrying link for a continuous track for tracked vehicles.

In the United States Patent No. 2,751,259 to the same applicant there has been described and illustrated a continuous tread of the track type, wherein there are secured rotatable members on the periphery of a track. The axes of rotation of these rotatable members are disposed along the length of the track so that they are able to rotate in a direction transversely of the track, and the track is in turn mounted on wheels connected with the vehicle and around which the track rotates.

In the device disclosed in said patent the transversely rotatable members are carried by articulated links, each of which engages the ground mainly through the rotatable members or rollers.

It is an object of the present invention to provide an improved type of articulated link by which a better engagement by the track of the ground is assured in treads or tracks of the type disclosed in said patent, and to provide a link that can obtain a better distribution of the load on the ground when the roller penetrates into the ground beyond a determined extent. According to the present invention this purpose is attained by providing each link with a lug arranged in a transverse direction with respect to the rotational axis of each roller.

It is another object of the invention to provide some preferred embodiments of the roller carrying link, in all the embodiments each link being provided with the aforementioned lug intended to engage the ground.

Other objects, features and advantages of the invention will be understood from the following description and claims in conjunction with the accompanying drawings which illustrate by way of example preferred embodiments of the invention, and in which Fig. 1 is a top plan view of a track link according to the invention and comprising two interconnected members carrying a pair of rollers the axes of the rollers being arranged parallel to the direction of general movement link the track with respect to a tracked vehicle;

Figs. 3 and 4 are front and rear elevational views, respectively, of the link of Figs. 1 and 2;

Figs. 7 through 12 are views corresponding to Figs. 1 through 6, and illustrate a different form of embodiment of the track link wherein the link body is constructed as a single piece obtained either by casting or by molding;

Fig. 15 is a side elevational view of a track link provided with three rollers according to the invention;

Fig. 16 is a front elevational view of the link of Fig. 15;

Figure 1:
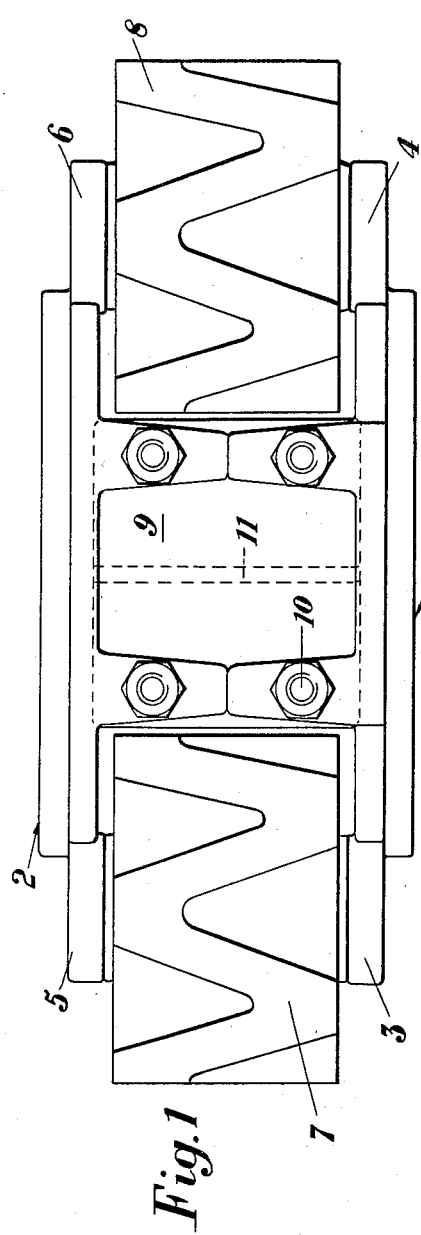
Figure 2:
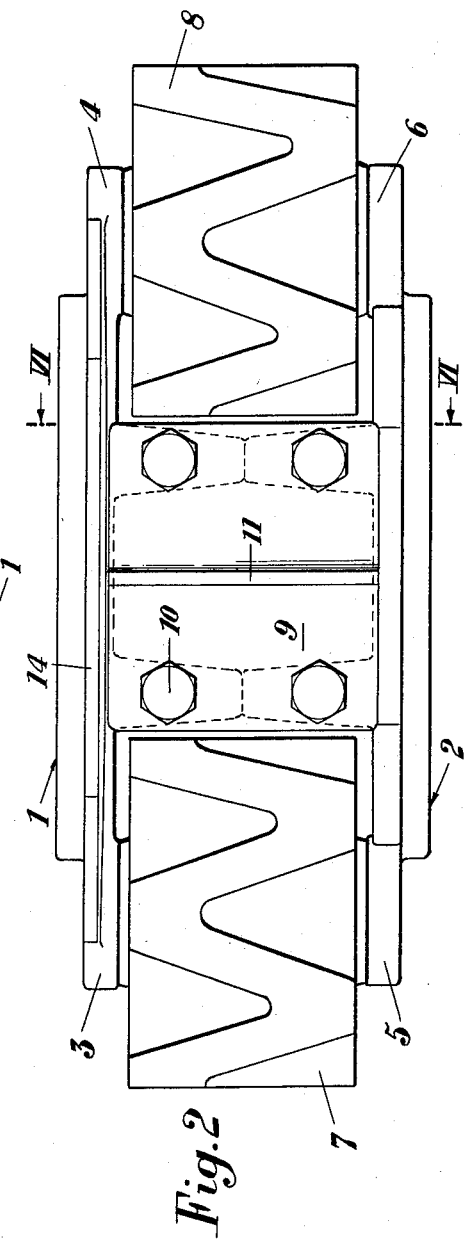
Fig. 2 is a bottom plan view of the link shown in Fig. 1.
Figure 5:
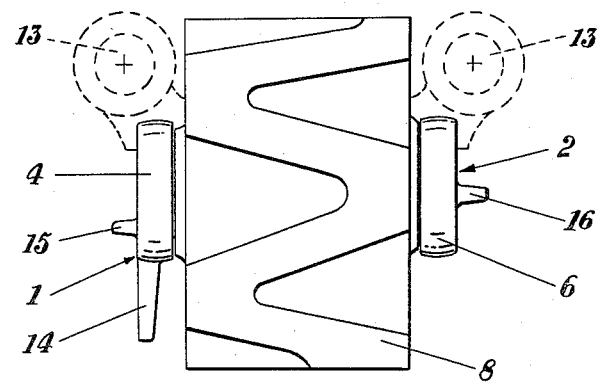
Fig. 5 is a side or end elevational view of the link shown in Figs. 1 through 4.
Figure 6:
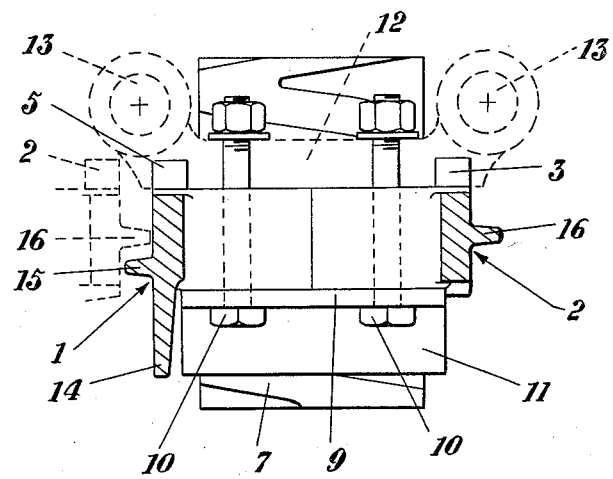
Fig. 6 is a vertical cross-sectional view taken along the line VI—VI of Fig. 2.

With reference to Figs. 1 through 6, showing a link of the type used to form endless treads or tracks consisting of members 1 and 2, provided at opposite ends with the mounting bushings 3, 4, 5 and 6 for shafts or axes of a pair of rollers 7 and 8, are connected to each other by bolts 10, and a plate 9 which is provided with a rib 11 extending lengthwise of the plate and transversely of the link. The bolts 10 (Fig. 6) pass through a plate or element 12 provided with integral portions 13 by which adjoining links are pivotally secured to each other to form a continuous track. The element 12 with the members 1 and 2 and the plate 9 forms the rigid framework of the track link.

Figure 18:
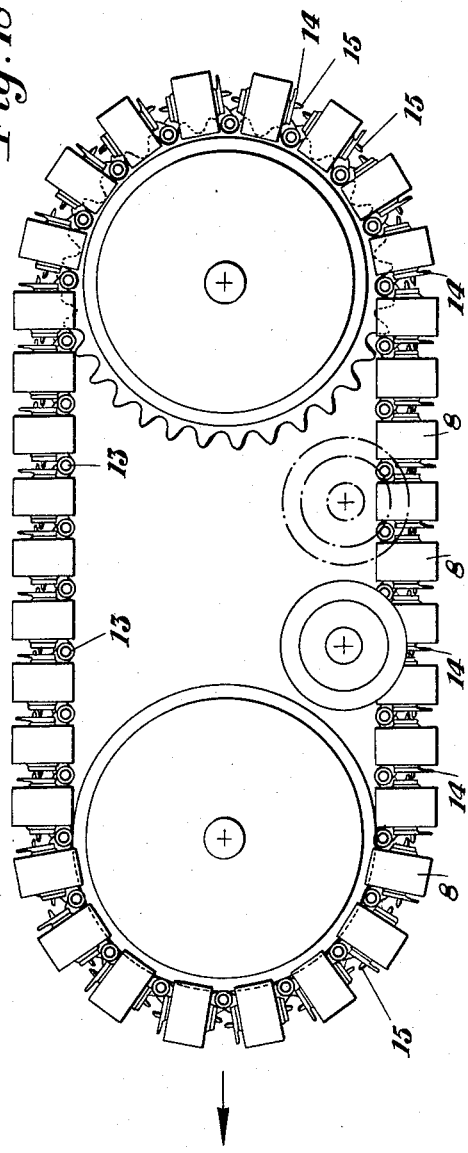
Fig. 18 is a diagrammatic showing of a track mounted on two wheels of a frame connected with a vehicle and wherein the track is formed with the improved links according to the invention.

It will be understood that in the embodiments of the link according to the invention including the link just described the rollers each rotate about individual axes which are disposed substantially parallel to the direction of general travel of the continuous track that they form. The track is driven, for example, by a toothed wheel on a vehicle (not shown) as illustrated in Fig. 18.

The cross member 1 is provided with a lug 14 constructed to engage the ground when the rollers penetrate the ground a predetermined extent. Also, said element 1 is provided with a laterally extending horizontal rib 15 intended to cooperate in overlying relationship with the ribs of the side of the member 2 of the next adjacent link, which in turn is provided with a horizontal rib 16 intended to cooperate with the side of the member 1 (Fig. 6) so that the contiguous links of the track, when in the lower run of the track rest on each other in order to ensure a good load distribution on the ground.

The form of embodiment shown in Figs. 7–12 differs from the preceding one in that the members 1 and 2 and the plate 9 are formed integral by casting or molding in a single block. All of the other elements are substantially identical to those of the first form or embodiment of the link according to the invention.

Figure 13:
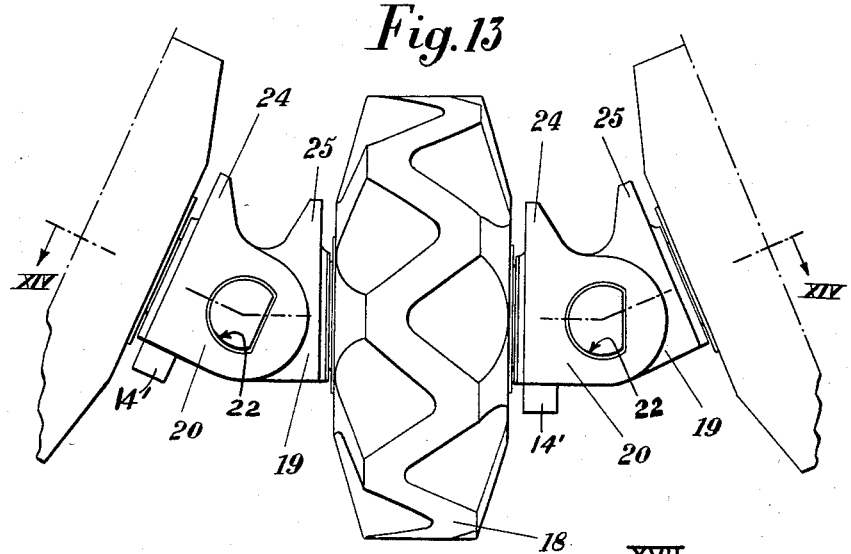
Fig. 13 is a side elevational view of another embodiment of a track link provided with a single roller, the axis of which is disposed parallel to the direction of general travel of the track of which it is a part.
Figure 14:
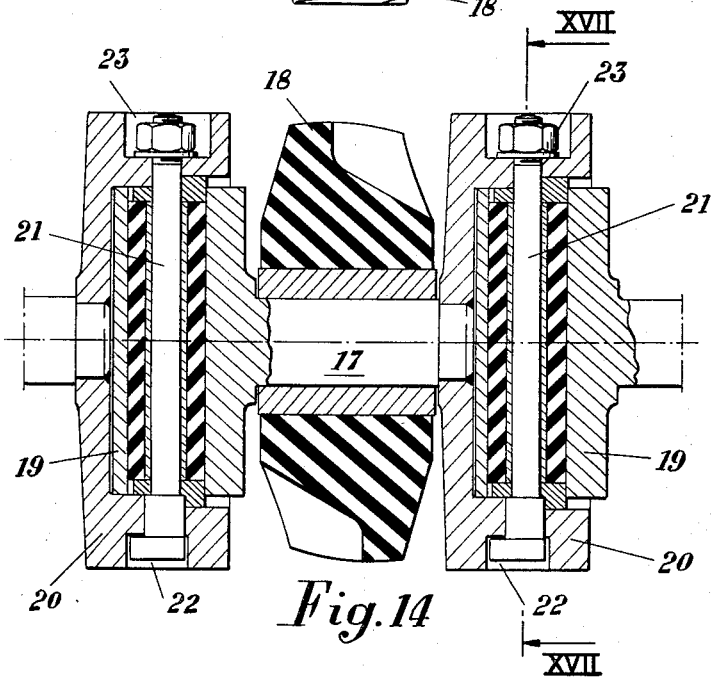
Fig. 14 is a vertical cross-sectional view of the track link shown in Fig. 13, taken along the line XIV—XIV of Fig. 13.
Figure 17:
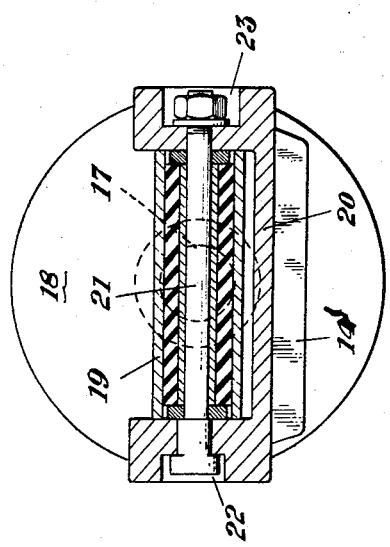
Fig. 17 is a cross section view taken along line XVII—XVII of Fig. 14.

Figs. 13, 14 and 17 show a third embodiment of a track link with a single roller for each link instead of two. The link comprises a roller carrying spindle 17 whereon a roller 18 is mounted. The spindle 17 carries at opposite ends thereof bushings 19 and 20, which cooperate with a cooperating bushing of the contiguous links by means of the pivots 21 the ends of which may be received within suitably shaped recesses 22 and 23 provided in the lateral ends of the bushing 20. Moreover, the bushing element 20 is provided with an integral lug portion 14' that engages the ground when the roller 18 penetrates into the ground beyond a predetermined extent.

The bushing 20 is shaped to receive the bushing element 19 of the next adjacent link and the element 19 on a given link cooperates with element 20 of a link on the opposite side of the given link. The bushing 20 is provided with an upper projection 24. The latter projection cooperates with an upper projection 25 of the bushing 19 in engaging the teeth of the driving and motive wheels of the tracked vehicle so that the track is driven by said wheels in the manner generally shown in Fig. 18.

Figs. 15 and 16 show another embodiment of a link for a track, wherein a member 26 carries two cross members 27 rigid thereto. The cross members carry three rollers 28, 29 and 30. The links of the track are articulated to each other by means of the pivots 31 and member 26. One of the cross members 27 is provided with a lower portion 14″ forming a lug for engaging the ground when the rollers 28, 29 and 30 penetrate into the ground beyond a predetermined extent.

I claim:

1. A traction device for track laying vehicles which comprises an endless track formed of a plurality of articulated links with at least one roller associated with each link of the track and rotatable about an axis parallel to the direction of general travel of the track, each link comprising, a body member providing two spaced substantially parallel portions for supporting at least one roller and having a portion fixing the parallel portions in fixed spaced relationship, at least one roller shaft disposed transversely of the parallel portions to provide said axis for the roller, one of said parallel portions having on its lower part a longitudinally extending lug for engaging the ground when the roller penetrates into the ground beyond a determined extent.

2. A traction device for track laying vehicles which comprises an endless track formed of a plurality of articulated links with at least one roller associated with each link of the track and rotatable about an axis parallel to the direction of general travel of the track, each link comprising, a body member providing two spaced substantially parallel portions for supporting at least one roller and having a portion fixing the parallel portions in fixed spaced relationship, at least one roller shaft disposed transversely of the parallel portions to provide said axis for said roller, each of said parallel portions having laterally extending ribs extending longitudinally of said parallel portions and arranged to cooperate in overlying relationship with ribs on parallel portions of the next adjacent link when making contact with the ground and one of said parallel portions having a longitudinally extending lug for engaging the ground when the roller penetrates into the ground beyond a determined extent.

3. A traction device for track laying vehicles which comprises an endless track formed of a plurality of articulated links with at least one roller associated with each link and rotatable about an axis parallel to the direction of general travel of the track, each link comprising, a single-piece body member providing two spaced substantially parallel portions for supporting at least one roller and having a portion fixing the parallel portions in fixed spaced relationship, at least one roller shaft disposed transversely of the parallel portions to provide said axis for the roller, each of said parallel portions having laterally extending ribs extending longitudinally of said parallel portions and arranged to cooperate in overlying relationship with ribs on parallel portions of the next adjacent track links when making contact with the ground, and one of said parallel portions having a longitudinally extending lug for engaging the ground when the roller penetrates into the ground beyond a determined extent.

4. A traction device for track laying vehicles which comprises an endless track formed of a plurality of articulated links with at least one roller associated with each link and rotatable about an axis parallel to the direction of general travel of the track, each link comprising, means for pivotally securing the links successively with one another, a pair of spaced substantially parallel plate members disposed transversely to the direction of travel of the track, at least one roller shaft disposed transversely of the plate members to provide said axis for the roller, and one of said plates having a longitudinally extending lug for engaging the ground when the roller penetrates into the ground beyond a determined extent.

5. A traction device for track laying vehicles which comprises an endless track provided of a plurality of articulated links with at least one roller associated with each link and rotatable about an axis parallel to the direction of general travel of the track, each link comprising, means for pivotally securing the links successively with one another, a pair of spaced substantially parallel plate members disposed transversely to the direction of general travel of the track, at least one roller shaft disposed transversely of the plate members to provide said axis for the roller, each of said plates having laterally extending ribs extending longitudinally of the plates and arranged to cooperate in overlying relationship with ribs on plates of the next adjacent links when making contact with the ground and one of said plates having a longitudinally extending lug for engaging the ground when the roller penetrates into the ground beyond a determined extent.

6. A traction device for track laying vehicles which comprises an endless track formed of a plurality of articulated links with two rollers associated with each link and rotatable about axes parallel to the direction of general travel of the track, each link comprising, means for pivotally securing the links successively with one another, a pair of spaced substantially parallel plate members, a pair of roller shafts disposed transversely of the plate members and substantially at opposite ends thereof to provide the axis for said rollers, each of said plates having laterally extending ribs extending longitudinally of the plates and arranged to cooperate in overlying relationship with ribs on plates of the next adjacent links when making contact with the ground, and one of said plates having a longitudinally extending lug for engaging the ground when the rollers penetrate into the ground beyond a determined extent.

7. A traction device for track laying vehicles which comprises an endless track formed of a plurality of articulated links with three rollers associated with each link and freely rotatable about axes parallel to the direction of general travel of the track, each link comprising, means for pivotally securing the links successively with one another, a pair of spaced substantially parallel plate members, three roller shafts disposed transversely of the plate members to provide the axes for said rollers, each of said plates having laterally extending ribs extending longitudinally of the plates and arranged to cooperate in overlying relationship with ribs on plates of the next adjacent links when making contact with the ground, and one of said plates having a longitudinally extending lug for engaging the ground when the rollers penetrate into the ground beyond a determined extent.

8. A traction device for track laying vehicles which comprises an endless track formed of a plurality of articulated links with at least one roller associated with each link and rotatable about an axis parallel to the direction of motion of the track, each link comprising, a roller shaft to provide the axis for said roller, a bushing at one end of the shaft and means at the opposite end of the shaft to receive and cooperate with a bushing on a roller shaft of a next adjacent link for pivotally connecting the links with one another and said means having a longitudinally extending lug for engaging the ground when the roller penetrates into the ground beyond a determined extent.

9. A traction device for track laying vehicles which comprises an endless track formed of a plurality of articulated links with at least one roller associated with each link and freely rotatable about an axis parallel to the direction of motion of the track, each link comprising, a roller shaft to provide said axis for said roller, a first bushing at one end of the shaft and means in the form of a second bushing at the opposite end of the shaft to receive and cooperate with a first bushing on a roller shaft of a next adjacent link, pivots for pivotally connecting the first bushing of each link to the second bushing of an adjacent link, said second bushing having a longitudinally extending lug for engaging the ground when the roller penetrates into the ground beyond a determined extent, said second bushing being provided with lateral recesses which receive said pivots.

References Cited in the file of this patent

UNITED STATES PATENTS

| | | |
|---|---|---|
| 2,695,819 | Parsons | Nov. 30, 1954 |
| 2,751,259 | Bonmartini | June 19, 1956 |
| 2,796,303 | Atkinson | June 18, 1957 |